United States Patent Office 3,425,974
Patented Feb. 4, 1969

3,425,974
ALKYD RESIN-AMINOPLAST RESIN COATING
COMPOSITION FOR GLASS
Charles V. Semroc, Natrona Heights, Pa., assignor to
P.P.G. Industries, Inc., a corporation of Pennsylvania
No Drawing. Filed Mar. 18, 1964, Ser. No. 352,953
U.S. Cl. 260—21                           8 Claims
Int. Cl. C08g 37/34; C02d 3/52

ABSTRACT OF THE DISCLOSURE

Amino-modified silane additives are added to compositions comprising alkyd resins and aminoplast resins to provide adherent coatings on glass substrates.

---

This invention relates to coating compositions especially adapted to provide adherent coatings on glass substrates, and more particularly to such compositions comprising an alkyd resin-aminoplast resin coating composition and an amino-modified silane additive.

Coating compositions based upon a combination of an alkyd resin and an aminoplast resin have become well known and are extensively employed for various applications. They provide hard and attractive coatings which are suitable for appliances, automobiles and similar metal articles.

Heretofore, compositions of this type have not been considered suitable for application to glass surfaces because of a lack of sufficient adhesion. This poor adhesion may be manifested by film separation, blistering, and the like, particularly upon exposure to moisture and weathering.

It has now been found that alkyd resin-aminoplast resin coating compositions can be satisfactorily employed to provide protective and decorative coatings on glass substrates if there is incorporated in the composition a small amount of a hydrolyzable aminosilane. The amount of aminosilane which produces satisfactory properties is from about 1 to about 8 percent by weight based upon the total nonvolatile resin solids of the composition. The compositions thus produced can be pigmented and formulated in the usual manner employed with alkyd resin-aminoplast resin coating materials, and provide heat-convertible coating having all the outstanding properties of this type of coating and, in addition, having greatly improved adhesion to glass surfaces.

Various hydrolyzable aminosilanes, and particularly aminoalkylsilanes, can be employed in the compositions described herein. A preferred class of aminosilanes are the aminoalkylalkoxysilanes, which may be represented by the following formula:

$$R'NH(CH_2)_xSi(OR)_{3-z}(R)_z$$

in which R is an alkyl or aryl radical, having up to about 8 or more carbon atoms, such as methyl, ethyl, propyl, butyl, amyl, hexyl, phenyl, substituted phenyl, or the like; R' is hydrogen or an aminoalkyl radical, having up to about 8 or more carbon atoms, such as —CH$_2$CH$_2$NH$_2$, —CH$_2$CH$_2$CH$_2$NH$_2$, etc.; $x$ is an integer from 2 to 4; and $z$ is an integer from 0 to 2.

Examples of preferred hydrolyzable aminoalkylsilanes are 3-aminopropyltriethoxysilane of the formula:

H$_2$NCH$_2$CH$_2$CH$_2$Si(OC$_2$H$_5$)$_3$ 4-aminobutylmethyldiethoxysilane of the formula:

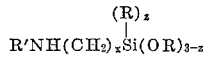

and compounds having the formula:

$$NH_2CH_2CH_2NHCH_2CH_2Si(OR)_{3-z}(R)_z$$

in which R and z are as defined above, such as N-(2-aminoethyl)-2-aminoethyltriethoxysilane. Other hydrolyzable aminoalkylsilanes which may be used include 2-aminoethyltriethoxysilane, 2-aminoethylphenyldiethoxysilane, 2-aminoethyldimethylethoxysilane, 2-aminopropyltripropoxysilane, 3-aminopropyltripropoxysilane, 3-aminobutylmethyldiethoxysilane, 4-aminobutyltriethoxysilane, N-(2-aminoethyl)-2-aminoethyltrimethoxysilane, and similar compounds.

The alkyd resin-aminoplast resin coating compositions to which the instant invention is applicable include those containing aldehyde condensation products of melamine or urea, and similar aminoplasts generally employed in coatings. Generally, the aminoplast resins form from about 5 to about 50 percent by weight of the total of the alkyd resin and aminoplast resin.

Aminoplast resins produced from melamine or urea are most common and are preferred. However, condensation products of other amines and amides can also be employed, for example, those of triazines, diazines, triazoles, guanidines, guanamines, and alkyl and aryl substituted derivatives of such compounds, including alkyl and aryl substituted ureas and alkyl and aryl substituted melamines, provided at least one amino group is present. Some examples of such compounds are N,N'-dimethylurea, benzyl urea, dicyandiamide, formoguanamine, acetoguanamine, benzoguanamine, ammeline, 2-chloro-4,6-diamino-1,3,5-triazine, 6-methyl-2,4-diamino - 1,3,5-triazine, 2-phenyl-4-amino-6-hydroxy-1,3,5-triazine, 3,5-diaminotriazole, triaminopyrimidine, 2-mercapto-4,6-diaminopyrimidine, 2,4,6-trihydrazine-1,3,5-triazine, 2,4,6 - triethyltriamino-1,3,5-triazine, 2,4,6-triphenyltriamino - 1,3,5-triazine, and the like.

The aldehyde is most often formaldehyde, although similar condensation products can be made from other aldehydes, such as acetaldehyde, crotonaldehyde, acrolein, benzaldehyde, furfural, and others.

These aldehyde condensation products contain methylol or similar alkylol groups, the structure of the alkylol group depending upon the particular aldehyde employed. At least a portion, i.e., all or part, of these alkylol groups may be etherified by reaction with an alcohol to provide organic solvent-soluble coatings. Any monohydric alcohol can be employed for this purpose, including such alcohols as methanol, ethanol, propanol, butanol, pentanol, hexanol, heptanol and other alkanols, usually having up to about 12 carbon atoms, as well as benzyl alcohol and other aromatic alcohols; cyclic alcohols, such as cyclohexanol; monoethers of glycols, such as the Cellosolves and Carbitols; and halogen-substituted or other substituted alcohols, such as 3-chloropropanol.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

Alkyd resins made from saturated oils or saturated fatty acids are preferred in formulating the compositions of the invention. However, there may be employed any of the saturated or unsaturated alkyd resins utilized in the coatings field, produced from any polybasic acid and polyfunctional alcohol. Thus, for example, the alkyd may be made from such polyfunctional acids as phthalic acid, maleic acid, fumaric acid, isophthalic acid, succinic acid, trimellitic acid, adipic acid, azelaic acid, sebacic acid, linoleic acid, fatty acids, and the like, as well as from anhydrides of such acids. The polyfunctional alcohol can be, for example, glycerine, trimethylolethane, trimethylolpropane, pentaerythritol, sorbitol, mannitol, ethylene glycol, diethylene glycol, 2,3-butylene glycol, and similar polyols.

The alkyd resin may be oil-modified or non-oil-modified. The oil, when one is utilized, is preferably coconut oil or other saturated oil, although drying or semidrying oils, such as fish oils, linseed oil, soybean oil or the like, can also be employed. If desired, the alkyd resin can contain a monobasic acid, such as benzoic acid, a substituted benzoic acid, or a similar monobasic aromatic acid. The alkyd can also be a polyester containing adipic acid or a similar acid along with various glycols and/or polyols.

Included within the scope of the term "alkyd resin" as used herein are reaction products of polybasic acids and polyfunctional alcohols as disclosed above, which are copolymerized with one or more other polymerizable ethylenically unsaturated monomers. Such monomers include esters of acrylic acid and methacrylic acid, acrylonitrile, olefinic hydrocarbons, and other such monomers containing a $CH_2=C<$ group.

The coating compositions of this invention are prepared by mixing the foregoing resinous components along with suitable solvents, such as xylene, toluene, butanol, acetone and the like, and, if desired, pigments or other coloring agents. In many instances, several alkyd resins and several aminoplast resins are included. The aminosilane can be added at any time and need only be thoroughly blended with the other components. The coating compositions are applied by conventional techniques, such as brushing, rolling or spraying, and are then baked to provide a hard, glossy, adherent coating. Typical baking schedules are from about 20 to 60 minutes at 225° F. to 350° F.

A typical alkyd resin-aminoplast resin enamel to which the instant invention is applicable is produced as follows:

A pigment paste is prepared by grinding together 259 parts of titanium dioxide, 40 parts of xylene, 11 parts of pine oil, and 26 parts of an alkyd resin (50 percent nonvolatile resin solids) made from 198 parts of coconut fatty acid, 139 parts of glycerol, and 218.5 parts of phthalic anhydride. This paste is reduced with an additional 37 parts of the alkyd resin, 4 parts of xylene, and 68 parts of butylated urea-formaldehyde resin (50 percent solids) made from 1.0 mole of urea, 2.2 moles of formaldehyde, and 1.73 moles of butanol. In formulating the enamel, the foregoing pigment composition is employed along with the above urea-formaldehyde resin, a butylated melamine-formaldehyde made from 1.0 mole of melamine, 6.0 moles of formaldehyde, and 4.3 moles of butanol, and a second alkyd resin made from 110 parts of coconut fatty acid, 106 parts of glycerol, 54 parts of para-tertiarybutyl benzoic acid, and 192 parts of phthalic anhydride, as follows:

| | Parts by wt. |
|---|---|
| Pigment composition | 445 |
| Urea-formaldehyde resin (50 percent solids) | 90 |
| Melamine-formaldehyde resin (60 percent solids) | 90 |
| Alkyd resin (65 percent solids) | 280 |
| Amyl phenol | 2 |
| Pine oil | 20 |
| Butanol | 35 |
| Naphtha | 43 |
| Triethylamine | 5 |

Exemplifying the method and practice of the invention were tests such as one in which 103 parts of the above enamel were blended with 6.6 parts of a 25 percent xylene solution of 3-aminopropyltriethoxysilane. The mixture was then coated on a glass panel and baked for 45 minutes at 250° F. For comparative purposes, a second panel was coated with the same enamel, but without any aminosilane added, and similarly baked. Both panels were then soaked for 222 hours in water at 95° F. and examined.

It was found that the panel containing the composition to which the aminosilane had been added retained its film strength and excellent apperance, and was still firmly adherent to the glass panel, whereas the film of the enamel without the aminosilane was badly blistered and the remaining film was very brittle.

Similar results are attained when various other aminosilanes, such as 4-aminobutyldimethoxysilane and others of the class described, are substituted for the 3-aminopropyltriethoxysilane in tests carried out in a manner analagous to that described above. Also, various other alkyd resin-aminoplast resin compositions can be utilized, with varying formulations. In all cases, the addition of aminosilane produces greatly improved adhesion of the coating composition to the glass substrate.

According to the provisions of the patent statutes, there are described above the invention and what are now considered to be its best embodiments. However, within the scope of the appended claims, it is to be understood that the invention can be practiced otherwise than as specifically described.

I claim:

1. A resinous composition adapted for producing adherent coatings on glass substrates comprising (a) a coating composition in which the vehicle consists essentially of a mixture of an alkyd resin and an aminoplast resin, and (b) from about 1 to about 8 percent by weight, based on the total of (a) and (b), of a hydrolyzable aminosilane of the formula:

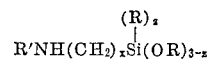

in which R is a member of the group consisting of alkyl and aryl radicals having up to about 8 carbon atoms, R' is a member of the group consisting of hydrogen and aminoalkyl radicals having up to about 8 carbon atoms, $x$ is an integer from 2 to 4, and $z$ is an integer from 0 to 2.

2. The composition of claim 1 in which said aminosilane is an aminoalkylalkoxysilane.

3. A resinous coating composition adapted for producing adherent coatings on glass substrates comprising (a) a coating composition in which the vehicle consists essentially of a mixture of an alkyd resin and an alcohol-modified condensation product of formaldehyde and a member of the group consisting of melamine and urea, and (b) from about 1 to about 8 percent by weight, based on the total of (a) and (b), of a hydrolyzable aminosilane of the formula:

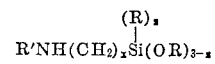

in which R is a member of the group consisting of alkyl and aryl radicals having up to about 8 carbon atoms, R' is a member of the group consisting of hydrogen and aminoalkyl radicals having up to about 8 carbon atoms, $x$ is an integer from 2 to 4, and $z$ is an integer from 0 to 2.

4. The composition of claim 3 in which said aminosilane is 3-aminopropyltriethoxysilane.

5. An article comprising a continuous glass surface having thereon an adherent layer of a cured composition comprising (a) a coating composition in which the vehicle consists essentially of a mixture of an alkyd resin and an aminoplast resin and (b) from about 1 to about 8 percent by weight, based on the total of (a) and (b), of a hydrolyzable aminosilane.

6. The article of claim 5 in which said aminosilane is an aminolkylalkoxysilane.

7. An article comprising a glass panel having thereon an adherent layer of a cured composition comprising (a) a coating composition in which the vehicle consists essentially of a mixture of an alkyd resin and an alcohol-modified condensation product of formaldehyde and a member of the group consisting of melamine and urea, and (b) from about 1 to about 8 percent by weight, based on the total of (a) and (b), of a hydrolyzable aminosilane of the formula:

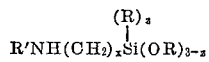

in which R is a member of the group consisting of alkyl and aryl radicals having up to about 8 carbon atoms, R' is a member of the group consisting of hydrogen and aminoalkyl radicals having up to about 8 carbon atoms, $x$ is an integer from 2 to 4, and $z$ is an integer from 0 to 2.

8. The article of claim 7 in which said aminosilane is 3-aminopropyltriethoxysilane.

References Cited

UNITED STATES PATENTS

| | | | |
|---|---|---|---|
| 2,940,945 | 6/1960 | Christenson et al. | 260—21 |
| 2,990,307 | 6/1961 | Stalego | 260—826 |
| 3,066,060 | 11/1962 | Gross | 260—826 |
| 3,088,847 | 5/1963 | Pines | 260—826 |
| 3,234,159 | 2/1966 | Cooper | 260—826 |
| 3,223,659 | 12/1965 | Curtice et al. | 260—850 |
| 3,297,785 | 1/1967 | George et al. | 260—850 |

OTHER REFERENCES

Paint Industry Technical Yearbook and Materials Manual, volume IV, 1959, Heckel Publishing Company, Philadelphia, Pa., 322 pages, page 225 relied upon.

DONALD E. CZAJA, *Primary Examiner.*

R. W. GRIFFIN, *Assistant Examiner.*

U.S. Cl. X.R.

260—22, 32.8, 33.4, 33.6, 37, 39, 40, 826, 850; 117—124, 161, 167